Dec. 2, 1930. P. L. TENNEY ET AL 1,783,931
TRANSMISSION CONTROL
Filed May 31, 1929  2 Sheets-Sheet 2
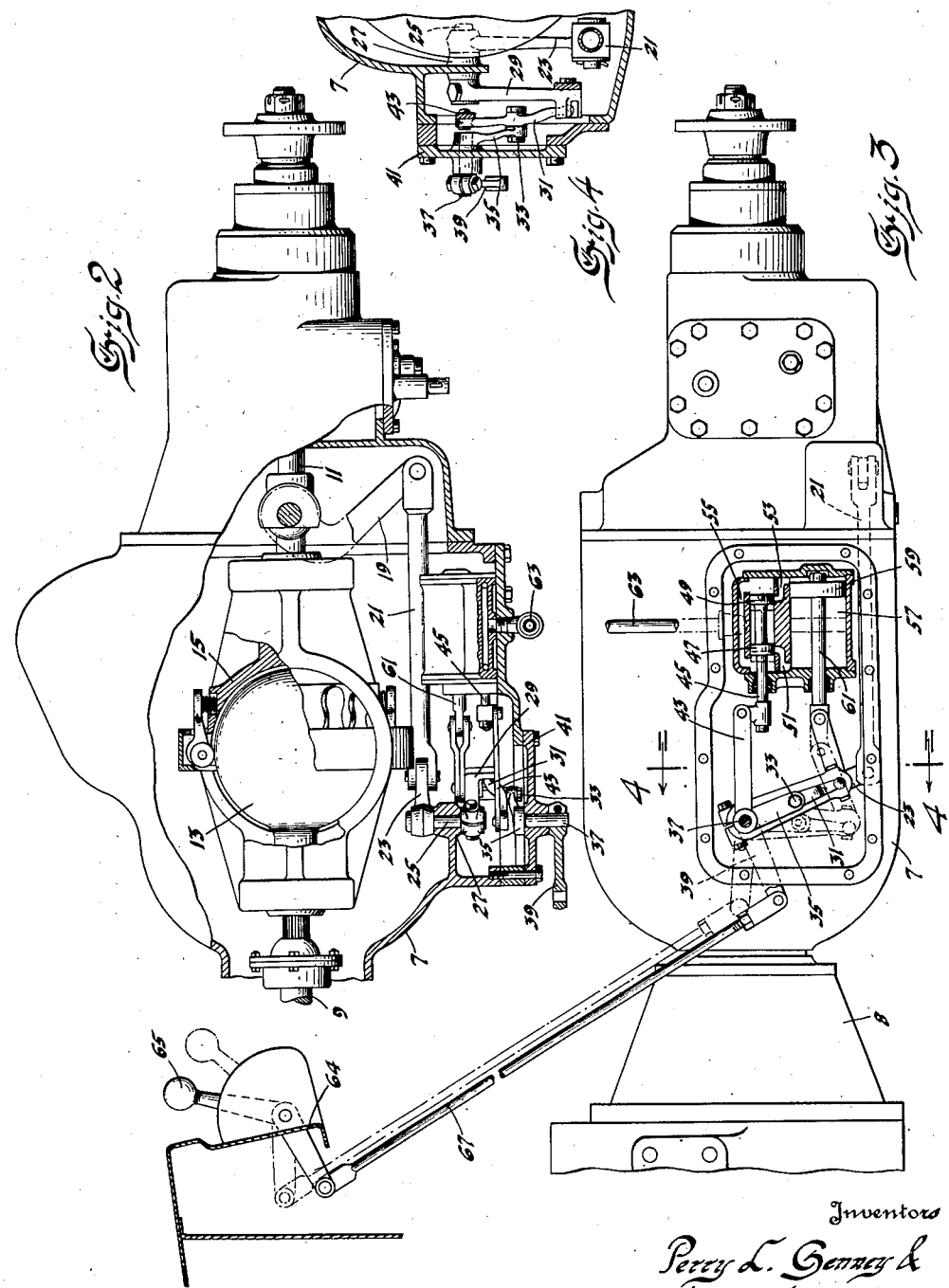
Inventors
Perry L. Tenney &
Harry E. Fidler
By Blackmore, Spencer & Fluke
Attorneys Patented Dec. 2, 1930

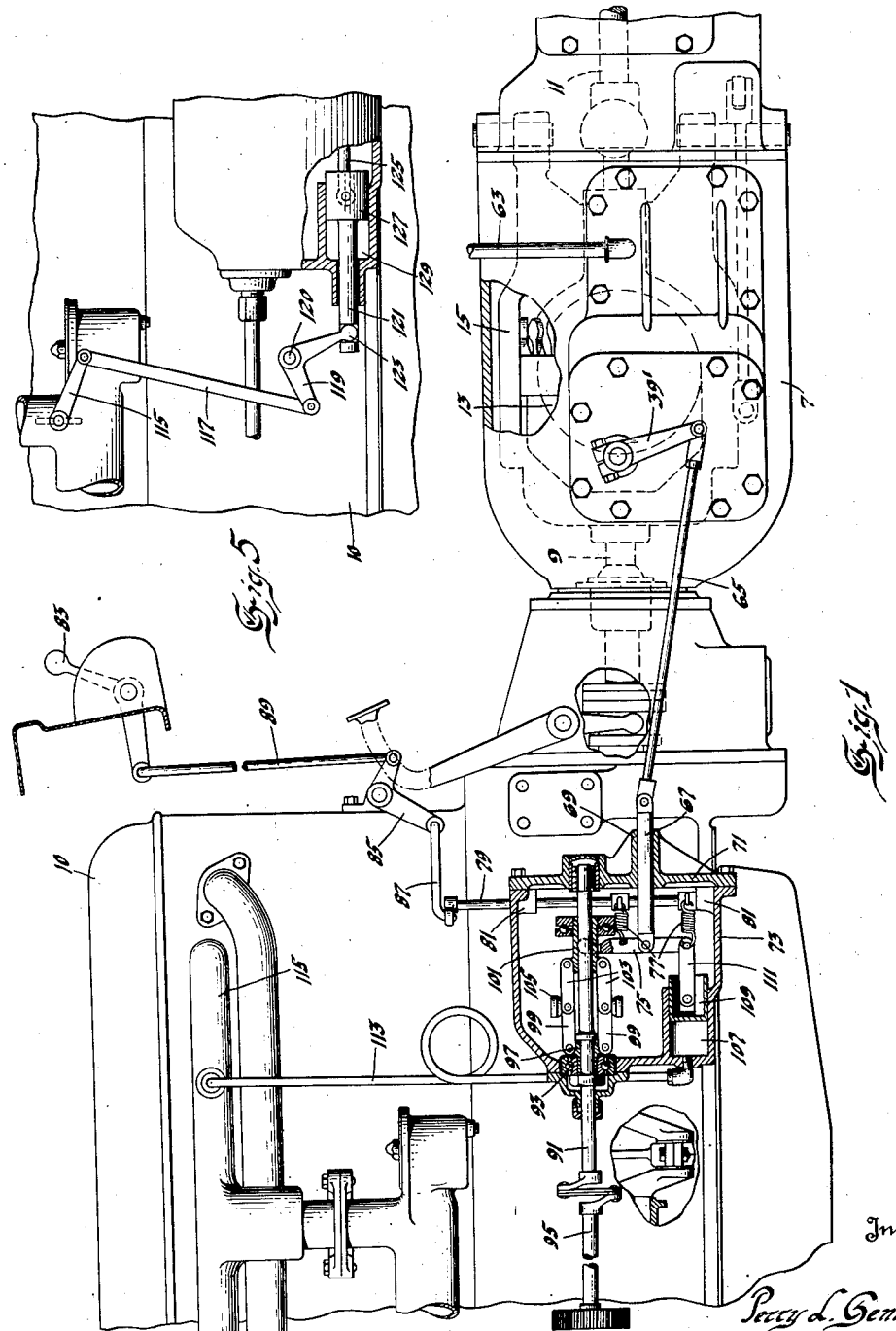

1,783,931

UNITED STATES PATENT OFFICE

PERRY L. TENNEY AND HARRY E. FIDLER, OF MUNCIE, INDIANA, ASSIGNORS TO GENERAL MOTORS CORPORATION, OF DETROIT, MICHIGAN, A CORPORATION OF DELAWARE.

TRANSMISSION CONTROL

REISSUED

Application filed May 31, 1929. Serial No. 367,243.

This invention relates to power transmission mechanism, and more particularly to an operating means for changing the speed ratio between the driving and driven shifts.

An object of the invention is to utilize a fluid medium under pressure to make the changes in the transmission, said fluid medium being either directly or indirectly under manual control. Another object of the invention is to provide an automatically operating mechanism, itself subject to manual control, to operate the change speed mechanism in accordance with the engine speed. Another object is to arrange for having the driving ratio between the driving and driven shafts change automatically, the changes being made by variations in engine speed and by changing pressure conditions in the engine manifold or by movements of the throttle valve. Other objects and advantages will be understood from the following description and the accompanying drawing.

In the drawing, Figure 1 is a view in side elevation of an engine of a motor vehicle with the clutch housing and transmission housing associated therewith, the transmission control device being shown in longitudinal section.

Figure 2 is a top plan view, partly broken away, of the change speed mechanism, the fluid pressure operating means being shown in section, this being an embodiment of the invention designed for direct manual control.

Figure 3 is a side elevation of the embodiment of the invention shown in Figure 2, the cover plate for the fluid pressure operating means being removed and parts being shown in section.

Figure 4 is a section of line 4—4 of Figure 3.

Figure 5 is a view in side elevation of a modification of the structure shown in Figure 1.

Referring first to Figures 2–3–4, numeral 7 represents a transmission housing associated with the clutch housing, 8, located, as usual, at the rear of the engine, 10, the latter not shown in Figure 2, but represented in Figure 1. The transmission mechanism within housing, 7, is designed to afford variable speeds between the driving shaft, 9, and the driven shaft, 11. The transmission is not per se a part of this invention. It comprises a ball member, 13, carried by driving shaft, 9, and a yoke, 15, having a circular series of rollers, gripping the ball. A lever, 19, is movably mounted to effect a predetermined angular relation between shafts, 9 and 11, whereby a reduction in driving ratio is effected to an extent proportional to the said angularity. When the shafts, 9 and 11, are in alignment, the drive is in direct, or high, speed. Low speed is effected by the maximum angularity between said shafts.

This invention is primarily concerned with the mechanism for rotating lever 19, to change the angularity between shafts, 19 and 11. As shown in Figure 2, lever 19 is connected by rod, 21, with lever arm, 23, on shaft, 25, these parts being better shown in Figure 4. Shaft, 25, is journalled at 27 in the casing. Shaft 25 has a second arm, 29. To the end of arm 29 is connected the end of a floating lever, 31. Intermediate its length, lever 31 is pivotally connected at 33 to the end of a lever arm 35, on a shaft, 37. Shaft, 37, has an operating arm, 39, preferably outside the casing cover, 41. The upper end of lever 31 is connected by a link, 43, to a valve stem, 45. Valve stem, 45, carries valves, 47 and 49, controlling passages 51 and 53, respectively, said passages 51 and 53 affording communication from a passage, 55, to the cylinder, 57, on one side of the other of the piston, 59, which is movable in cylinder 57. A pipe, 63, leads to passage, 55, from any suitable source of fluid supply, such as a pump or reservoir, not shown. Piston 59 is connected by its rod, 61, to the lower end of lever 31 and arm 29. In Figure 3, I have shown in section the instrument board, 64, on which is mounted a lever, 65. From the lever, 65, extends a link, 67, the link being connected at its lower end to the end of arm 39. When the parts are positioned as shown in full lines in Figure 3, the driving and driven shafts of the transmission are assumed to be in alignment. The valves are closed. If the lever, 65, is moved toward the dotted line position, arm 39 swings clockwise, as also does arm 35. The resistance offered by the transmission elements and by the piston 59 in the cylinder, 57, renders the lower end of floating lever 31 relatively immovable, as compared with the upper end. The lever 31 therefore swings counter-clockwise about its lower end and pulls upon rod, 43, and opens valve 49. This opens up a passage for a flow of fluid from passage 55 through 53 into the right hand end of cylinder 57. The piston, 59, is therefore moved to the right. Since its rod is connected to the lower end of lever 31, to which lever arm 29 is also connected, this movement of the piston operates through arm 23 and rod 21 to swing lever 19 and change the driving ratio between the driving shaft, 9, and driven shaft, 11. The movement of the piston also operates as it turns lever 31 about its pivot, 33, to move link 43 to the right and to close valve 49. A further movement of the transmission may be effected by a further movement of lever 65, the valve being self-closing after each movement of the lever.

In Figure 1, lever 39′ corresponds to lever 39 in that its rotation operates the same transmission within housing 7, for controlling the speed reduction. In this case the lever 39′ is controlled only indirectly by a manually operated lever. In this form, provision is made to vary the angularity of the shafts 9 and 11 in accordance with the operation of the engine. I have shown provision for varying the reduction ratio in proportion to the speed of the engine and also in proportion to the degree of suction in the engine manifold.

Lever 39′, which may be called a movable means to control the transmission, is connected by a link, 65, to a rod, 67, slidably guided in a sleeve, 69, in the end wall, 71, of a housing, 73, positioned adjacent the engine. Within the housing, 73, the rod, 67 is pivoted to an intermediate point of a movable member or bar, 75, positioned normally at a right angle to rod 67. To offer resistance to the movement of bar 75, to the left, are springs, 77, connected to the member, 75, at substantially equal distance from the pivot of the bar, 75, whereby the action of the springs is equalized. At their other ends the springs are connected to a rock shaft, 79, journalled at 81 in the casing walls. Rotation of the rock shaft to variably (and equally) tension springs, 77, is effected by a lever, 83, at the dash, a bell crank, 85, and connecting links, 87, and 89. Within the housing, 73, is rotatably mounted a shaft, 91. Shaft 91 extends out through a suitable bearing, 93, in the front wall of the housing and is jointed to a shaft, 95, which is to be driven by the engine in any suitable way. Pivoted to a sleeve, 97, rotatably carried by the shaft but held from axial movement thereon are plurality of links, 99. Rotatably and slidably mounted on shaft 91 is a second sleeve, 101 spaced from sleeve 97. Sleeve 101 has pivoted thereto a series of links, 103. Links 103 and 99, at their adjacent ends, are pivoted to each other, weights, 105, being carried by pivotal connection. This construction is designed to constitute a centrifugal governor. Lever 75 is extended beyond its connection with the upper spring, 77, and at its end is connected to the movable sleeve, 101, so that when said sleeve moves, as to the left, under the centrifugal action of weights, 105, it moves the upper end out of lever 75 with it. At the bottom of case 73 is a cylinder, 107, within which is a piston, 109. A rod, 111, connects piston, 109, to the end of lever, 75. A tube, 113, connects the engine manifold 115, with a cylinder, 107, the suction of the manifold tending to move the piston, 109, to the left, the piston being subject to atmospheric pressure on the right. This movement will tend to move bar 75 to the left and through its movement operate to change the transmission through the instrumentality of links 65 and lever 39′. It will be evident that increase in engine speed will cause an increase in rate of rotation of shaft, 91. The centrifugal governor will therefore be effective to pull bar, 75, to the left and operate through link 65 and arm 39′ to change the speed ratio of the transmission. In such movement of bar, 75, to the left, under the influence of the governor or of suction of cylinder, 107, the bar may be moved against the tension of springs, 77, which may be variably controlled through the action of manually operated lever, 83. It will be seen, therefore, that if the position of lever 39′ is such as to maintain the transmission in its low speed position a movement of 75 to the left, due to the governor or to increase in suction cylinder 107, or both, will change the transmission ratio toward its normal or direct speed.

In Figure 5, we have shown as a substitute for the suction operated mechanism a mechanical connection between the throttle valve and the bar, 75. In this case the arm, 115, on pivot axis of the throttle valve, is connected by a link, 117, to a bell crank, 119. The bell crank is pivoted at 120. A rod, 121, is pivotally connected to the bell crank at 123. This rod, 121, is connected to a rod, 125, the latter to be pivotally connected to the bar, 75, as shown in Figure 1. For proper guidance of this rod connection, rod 121 may have an enlargement, 127, guided in a suitable member, 129. In this form of the invention, when the throttle valve is open and the suction condition of the manifold is reduced, the connections produce precisely the same effect as when the piston, 109, is at the right hand end of cylinder, 107, in Figure 1. Since a closed throttle corresponds with high suction, the operation is substantially the same as in the form shown by Figure 1. As shown in Figure 1 and Figure 3, the transmission housing 7, is extended somewhat to the rear of the parts already described. The purpose of this extension is to provide for associating with the gearless variable speed transmission an independent transmission, to provide for reverse drive and, if desired, a further low speed ratio. Such second transmission unit is not a part of this invention and since it may be of any known form, it need not be described or illustrated. Such supplementary transmission may be operated by an independent operating means. If desired, it may be operated by a lever on the instrument board. In this event, the lever may be given a plurality range of movement—one for operating the mechanism herein described and other ranges of movement for operating the supplementary gear shifting mechanism. Such a plurality of ranges may be adopted as is shown in the co-pending application of Tenney S. N. 338,720 and assigned to the assignee of this application.

Claims:

1. In combination with an infinitely variable transmission, an operating mechanism therefor comprising an operable member, transmission actuating means to actuate said variable speed transmission, a fluid pressure valve, a connection between said operable member and said valve and said transmission actuating means whereby said operable member operates through said valve to move said transmission mechanism by fluid pressure and whereby said connection thereafter closes said valve, together with a power cylinder having a piston, said cylinder being in communication with said valve, said connection including a floating lever, one end of said lever operably connected to said valve, the other end of said lever operably connected to said transmission operating means and to the piston of the power cylinder.

2. In combination, a variable speed transmission comprising a driving shaft and a driven shaft, driving means therebetween, means to vary the angular relation between said shafts to vary the drive ratio therebetween, a fluid pressure control valve, a power cylinder with a piston therein, the cylinder being in communication with said valve, a lever, one end of said lever operably connected to said valve, the other end of said lever connected to said means for varying the angularity of the transmission shafts and also connected to said piston, an operating member, a mechanical connection therefrom to an intermediate point of said lever.

3. In combination an engine having an induction conduit, a variable speed transmission comprising a driving shaft and a driven shaft, driving means therebetween, means to vary the angular relation between said shafts to vary the drive ratio therebetween, mechanism movable by changes in engine speed, and an operable connection between said mechanism and the said means to vary the driving ratio.

4. In combination, an engine having an induction conduit, a variable speed transmission comprising a driving shaft and a driven shaft, driving means therebetween, means to vary the angular relation between said shafts to vary the driving ratio therebetween, mechanism movable by changes in the fluid pressure within said induction conduit, and an operable connection between said mechanism and the means to vary the driving ratio.

5. In combination, an engine having an induction conduit, a variable speed transmission, comprising a driving shaft and a driven shaft, driving means therebetween, means to vary the angular relation between said shafts to thereby vary the driving ratio therebetween, mechanism moved by changes in engine speed and the changes in the pressure within said conduit, and an operable connection between said mechanism and the means for varying the driving ratios.

6. In combination, an engine having an induction conduit, a variable speed transmission, movable transmission operating means, to change the speed ratios provided by said transmission, mechanism movable by changes in engine speed and by changes in the pressure within said conduit to move said movable means together with resilient means normally operable to produce a low speed driving ratio within said transmission.

7. In combination, an engine having an induction pipe, a variable speed transmission to be driven by said engine, movable means to vary the speed ratio of said transmission, a centrifugal governor and an engine suction operated device, a movable member, said member being connected to said movable means and to said governor and said suction control device, together with resilient means connected to and operating to resist such movements of said member as operate to increase the speed ratio provided by said transmission, and manually operated means to control the tension of said resilient means.

8. In combination with an internal combustion engine, having a fuel intake conduit, a shaft driven by said engine, a governor on said shaft, a fluid pressure cylinder having a piston, a pipe from said fuel conduit to said cylinder, a lever member terminally connected to said governor and said piston, a variable speed transmission for said engine, movable means to vary the speed ratio thereof, a connection between said lever member and said means.

9. The invention defined by claim 8, together with resilient means connected to and operable upon said member against that motion of the member by the governor and piston which tends to increase the speed provided by the transmission, and manually operable means to control the action of said resilient means.

10. In combination, an internal combustion engine, having a fuel inlet conduit, a variable speed transmission driven by said engine, fluid pressure operated means, to vary the speed ratio of said transmission, said fluid pressure operated means including a power cylinder and a self-closing valve, movable means to control said transmission, a connection from said movable means to said valve, said connection including a lever, a connection from said lever to said power cylinder through which said power cylinder operates to close the valve, a movable member, a connection between said movable member and movable means, automatically operable mechanism controlled by the speed of the engine to move said movable member.

11. In combination, an internal combustion engine, having a fuel inlet conduit, a variable speed transmission driven by said engine, said transmission having a shifting device, fluid pressure operated means to vary the speed ratio of said transmission, said fluid pressure operated means including a power cylinder, having a piston and a valve, said valve being in connection with said cylinder, movable means to control said transmission, a lever pivoted to said movable means, a connection from one arm of the lever to the valve, connections between the other arm of the lever and the piston of the power cylinder and also the said shifting device, a movable member, a connection between the movable member and the movable means and a mechanism responsive to the speed of the engine and the pressure within said fuel inlet to automatically control the action of said transmission through said movable member and movable means.

12. The invention defined by claim 11, together with resilient means, connected to and operable upon said movable member to reduce the speed ratio of said transmission, and manually operable means to control said resilient means.

13. In combination with an internal combustion engine of a vehicle, a variable speed transmission comprising a driving shaft and a driven shaft and driving means therebetween, means to vary the angular relation between said shafts to thereby vary the driving ratio therebetween, mechanism moved by variation in engine speed and connecting means between said mechanism and the ratio varying means to automatically move said ratio varying means.

14. An engine having an infinitely variable speed transmission connected thereto, fluid pressure mechanism, connections between said fluid pressure mechanism and said variable speed transmission whereby the fluid pressure mechanism operates to control the speed ratio of said transmission, a floating lever, connecting means between said floating lever and said fluid pressure mechanism, a member movable in response to changes in engine speed, and a connection between said member and said lever.

In testimony whereof we affix our signatures.

PERRY L. TENNEY.
HARRY E. FIDLER.